UNITED STATES PATENT OFFICE.

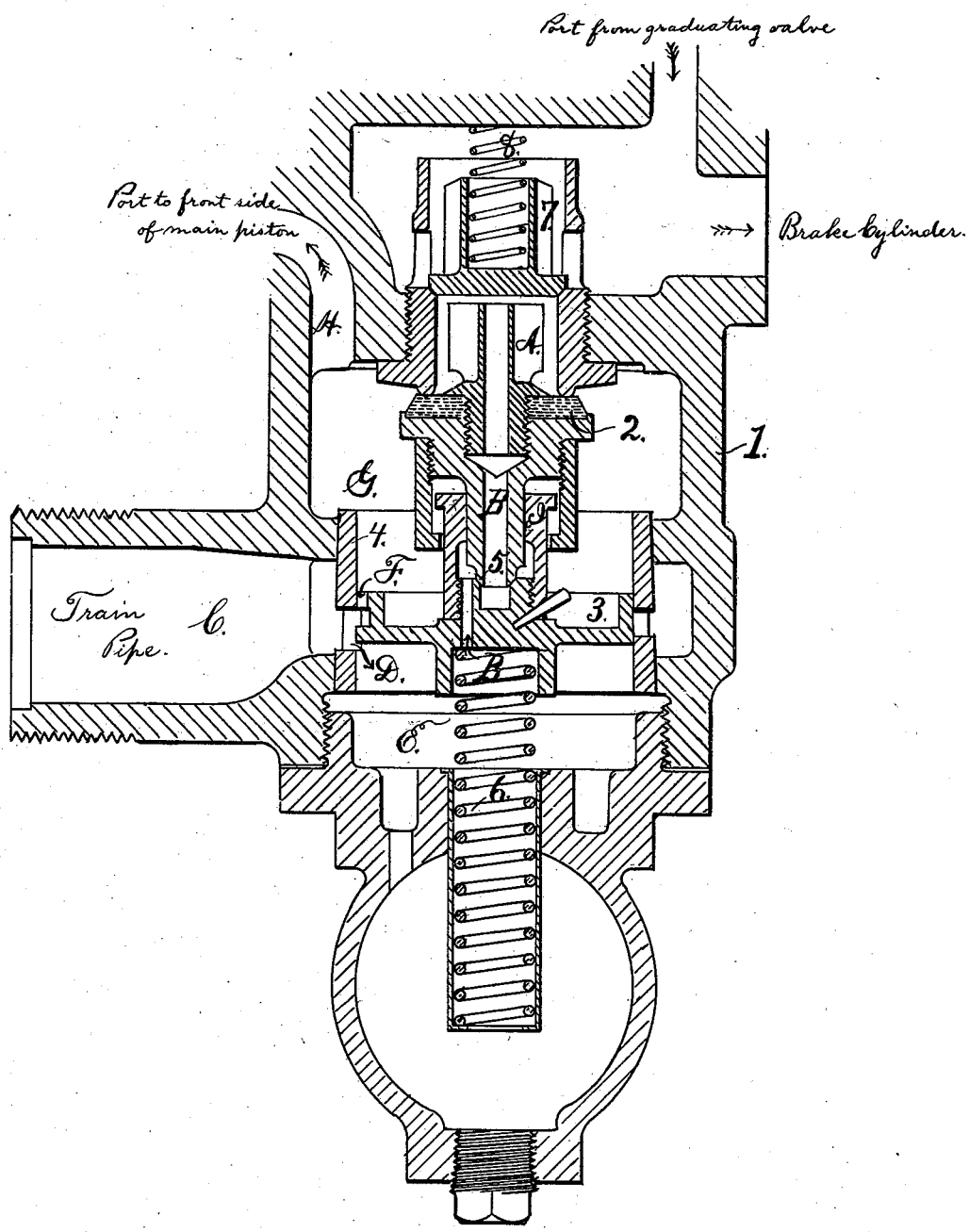

PAUL SYNNESTVEDT, OF OAK GLEN, ASSIGNOR TO THE CRANE COMPANY, OF CHICAGO, ILLINOIS.

TRIPLE-VALVE MECHANISM FOR AUTOMATIC AIR-BRAKES.

SPECIFICATION forming part of Letters Patent No. 556,221, dated March 10, 1896.

Application filed March 20, 1895. Serial No. 542,495. (No model.)

*To all whom it may concern:*

Be it known that I, PAUL SYNNESTVEDT, a citizen of the United States, residing at Oak Glen, Cook county, Illinois, have invented certain new and useful Improvements in Triple-Valve Mechanism for Automatic Air-Brakes, of which the following is a specification.

My invention relates particularly to what is known as the "emergency" or "quick-action" valve, and is in the nature of an improvement on the construction shown in Patent No. 504,139, issued to me August 29, 1893. In the use of the device therein set forth difficulty has been experienced in the nature of interference with its proper operation by lodgment of dirt in and around the parts. The piston being necessarily wide or cup-shaped, in order to prevent its binding, affords a large bearing-surface for the accumulation of dirt, and the sliding fit between the piston and the valve-stem being of considerable diameter and necessarily closely fitted increases this difficulty.

The primary object of my invention is to do away with this sliding fit entirely and utilize in place thereof as a guide for the piston the stem of the supplemental valve itself. This makes it easier to secure a minimum of leakage between the valve-chamber above the emergency-piston and the cavity below. It has been found that if such leakage be excessive the device will not be sufficiently sensitive in action.

Another difficulty which has been encountered in the use of the construction shown in the patent above referred to arises from the smallness of the stem of the supplemental valve, (necessitated by the fact that it must operate inside of the stem of the emergency-valve proper,) the violence of the action in cases of emergency sometimes breaking the stem, or upsetting it at the point where the valve seats, so as to prevent its withdrawal.

The above-mentioned defects may result either in so disabling the apparatus that no emergency action is possible, or else in causing the valve to stick open after an application is made, resulting in a total failure to release.

By my present invention I aim to eliminate all these objectionable features.

Referring to the accompanying drawing, I will now describe my invention more in detail.

The illustration given is a sectional view of the emergency part only of a triple valve, the other parts, forming no part of my present invention, and be ingsubstantially identical with those in common use, having been omitted.

The connections to the train-pipe and brake-cylinder are made as usual, and for convenience of reference are marked on the drawing.

1 is a casing which holds the parts.

A is an opening or port leading from a train-pipe to a brake-cylinder. 2 is a valve for controlling said opening. 3 is a piston for operating said valve, and 4 is a bushing in which said piston works.

B is a passage leading from a cavity below the emergency-piston to the brake-cylinder, and 4 is a supplemental valve for controlling said passage.

6 is a spring which helps to hold the parts in normal position and serves after an application to return them to that position when the pressures have equalized.

7 is a check-valve such as is commonly used to prevent the return of brake-cylinder pressure to the train-pipe in case of a rupture or separation of the train-pipe, and 8 is a spring for holding said check-valve against its seat.

In general the operation of the device is the same in principle as that shown in Patent No. 504,139 above referred to.

Air enters from the train-pipe at C, passes through the port D to the cavity E on the under side of the emergency-piston, through the by-pass F to the emergency-valve chamber G, and thence through the passage H to the main piston. In the ordinary functions of braking air passes in and out through the by-pass F without moving any of the emergency parts, as the flow is so gradual there is not sufficient force exerted against the piston to unseat either of the valves. On a sudden and extreme reduction of the air in the train-pipe, however, the pressure in the cavity E below the piston 3 reduces more rapidly than the pressure above it, as the port D is considerably larger than the by-pass F. This causes the piston to move downward and unseat the supplemental valve 5, venting the pressure from cavity E to the brake-cylinder. The pressure on the under side having been thus suddenly still further reduced the piston continues its downward movement, uncovering the upper edge of the port D and permitting the air to flow through said port from the train-pipe, which air, acting upon the upper side of the piston, in conjunction with the air in the chamber above the piston, accelerates its downward movement with augmented power, thereby jerking and holding the emergency-valve 2 away from its seat, vents the remainder of the train-pipe pressure to the brake-cylinder. As soon as the pressure in the cavity E has equalized by leakage with that above the piston 3 the parts are all returned to the position shown by the spring 6.

Comparing the mechanism of this device with that of the patent before referred to it will be noted that by turning the supplemental valve end for end and forming said valve integral with the stem of the emergency-valve I am enabled to use the stem of the supplemental valve as a guide for the emergency-piston, the only close fit required besides that of the piston being the one shown at I around the supplemental-valve stem. Thus I secure a guide for the piston, which is of much smaller diameter, has less bearing-surface than the one used in the prior construction, and which therefore is much less apt to stick or bind. By this arrangement I secure further, without any material increase in the size or weight of the apparatus as a whole, a larger and stronger puppet-valve stem, which will not break under strain or become bent or upset from constant use. Having arranged a better guide for the piston I am enabled to make the piston itself narrower, doing away with a large amount of its bearing-surface. I am also enabled, without increasing the size or length of the casing, to use a spring 6 of greater length, which is an advantage of no inconsiderable moment, as the strain to which it is subjected is severe and if short it is apt to lose its elasticity from too great a degree of compression.

Having thus described my invention, what I claim as new, and desire to secure by Letters Patent, is—

In emergency-valve mechanism for air-brake triple valves, the combination of an emergency-valve for controlling an opening from a train-pipe to a brake-cylinder; a piston for operating said valve; and a supplemental valve for controlling a discharge-port from one side of said emergency-piston by movement of the latter, the stem of said supplemental valve adapted to act as a guide for said piston, substantially as described.

PAUL SYNNESTVEDT.

Witnesses:
W. W. GARRARD,
F. N. WINNE.